United States Patent
Dean et al.

[11] Patent Number: 6,128,922
[45] Date of Patent: Oct. 10, 2000

[54] DISTILLATION METHOD AND COLUMN

[75] Inventors: Mary Helen Dean, Elizabeth; Richard W. Potthoff, Scotch Plains; Robert M. Thorogood, New Providence, all of N.J.; Ramachandran Krishnamurthy, Chestnut Ridge, N.Y.

[73] Assignee: The BOC Group, Inc., New Providence, N.J.

[21] Appl. No.: 09/316,820

[22] Filed: May 21, 1999

[51] Int. Cl.[7] ........................................... F25J 1/00
[52] U.S. Cl. ............................................. 62/643; 62/906
[58] Field of Search ........................... 62/643, 906

[56] References Cited

U.S. PATENT DOCUMENTS

| | | |
|---|---|---|
| 4,813,988 | 3/1989 | Bennett et al. ............... 62/906 |
| 4,836,836 | 6/1989 | Bennett et al. ............... 62/906 |
| 5,237,823 | 8/1993 | Cheung et al. ............... 62/906 |
| 5,613,374 | 3/1997 | Rohde et al. ................. 62/643 |

*Primary Examiner*—Ronald Capossela
*Attorney, Agent, or Firm*—Salvatore P. Pace

[57] ABSTRACT

A distillation method and column in which a gaseous mixture is introduced into a bottom region of a packed column having a plurality packed beds using structured packing. The gaseous mixture comprises higher and lower volatility components. The packed column is operated so that the higher and lower volatility components have a relative volatility within the column in a range of between 1.05 and 1.8. In order to alleviate the effect of liquid maldistribution in the lowermost bed of such a column, the lowermost bed is sized to be between about 50% and about 80% of the height of the next overlying bed, with 80% being preferred and the total height of the packing within the column is at least about six meters.

8 Claims, 2 Drawing Sheets

DISTILLATION METHOD AND COLUMN

BACKGROUND OF THE INVENTION

The present invention relates to a method and apparatus for distilling a mixture within a distillation column containing structured packing. More particularly, the present invention relates to such a method and apparatus in which the mixture components have close relative volatilities such as in the separation of argon from oxygen. Even more particularly the present invention relates to such a method and apparatus in which the distillation is effectuated in multiple beds of structured packing and the lowermost bed of packing has a lower height than the next higher bed of packing.

Two components may be separated from one another in a distillation column by introducing a gaseous mixture containing the two components into a bottom region of the distillation column. The introduction of the gaseous mixture initiates formation of an ascending vapor phase of the mixture. This ascending vapor phase is condensed at the top of the column to produce reflux, thereby to initiate formation of a descending liquid phase of the mixture. As the liquid phase descends it contacts the ascending vapor phase within a liquid-vapor mass transfer device such as a structured or random packing. As a result of such contact, the ascending vapor phase becomes every more concentrated in the higher volatility component while the liquid phase becomes ever more concentrated in the lower volatility component.

As the relative volatility between the components approach unity, that is the components are close boiling components, the distillation becomes more difficult. In order to accomplish such a distillation a greater height of packing is used as compared with the packing height required for distillations not involving the separation of mixtures having such close boiling components. Examples of such close boiling components are argon and oxygen, ethyl benzene and styrene and etc.

In the case of packed columns, either random or structured, the height of packing for a particular distillation can be experimentally determined. This height is based on the height equivalent to a theoretical plant or HETP. The number of theoretical plates or stages required for a particular distillation is determined in a known manner with reference to the vapor-liquid equilibrium curve of the particular mixture to be separated. The column is then packed with a sufficient amount of packing to equal to the number of theoretical plates or stages required for the distillation.

It has been found, by the inventors herein, that a factor of safety must be used in such calculations, especially in case of distilling close boiling components, because distillation column does not perform in the exact same manner as that suggested by theoretical calculations and experimental data for a particular packing. Specifically, if multiple packed beds are used and all beds are of equal height, then the performance of the lowermost bed will be the worst out of all the beds. As such, columns are taller and therefore use more packing than would initially thought to be necessary based upon theoretical calculation and experimental data.

As will be discussed, the inventors have discovered a method of conducting a distillation of close boiling components that can be effectuated by a column design that more closely mirrors theoretical calculations than prior art column designs.

SUMMARY OF THE INVENTION

The present invention provides a distillation method in which a mixture is introduced into a packed column. The mixture comprises higher and lower volatility components. The packed column is operated such that the higher and lower volatility components have a relative volatility within said packed column in a range of between about 1.05 and about 1.8. The mixture is distilled within the packed column by forming ascending and descending gaseous and liquid phases of the mixture and contacting said gaseous and liquid phases within structured packing arranged within packed beds such that a lowermost of said packed beds has a height within a range of between about 50% and about 80% of a next higher of the packed beds and the total height of the packing within the packed column is equal to at least about six meters.

In another aspect, the present invention provides a distillation column for distilling a mixture comprising higher and lower volatility components. The distillation column comprises a column shell having a bottom inlet to receive said mixture as a gas, a top outlet for discharging a tower overhead stream and a top inlet for introducing a reflux stream into the said distillation column. A structured packing located within the distillation column for contacting ascending vapor and descending liquid phases of the mixture and such that the ascending vapor phase becomes ever more concentrated in the higher volatility component and the liquid phase becomes ever more concentrated in the lower volatility component as it descends. The structured packing arranged in packed beds such that a lowermost of said packed beds has a height within a range of between about 50% and about 80% of a next higher of said packed beds and the total height of the packing within the distillation column is equal to at least about six meters.

In either aspect of the present invention, the height of the lowermost bed of the packed beds can be about 80% of that of said next higher of the packed beds. More than three of said packed beds can be used to effectuate the distillation and the packed beds above said lowermost bed may be of equal height. Furthermore, the higher volatility component can be argon and the lower volatility component can be oxygen. In such case, the distillation column is an argon column operable for connection with a lower pressure column of a double column air separation unit.

It has been found by the inventors when a distillation is conducted by such a method or with the use of the distillation column described above, the column will function in a more ideal manner because the lowermost bed is less susceptible to liquid maldistribution. Thus, a column can be designed less conservatively and will utilize less packing than a prior art column. The reduction in the height of packing in the column will result in lower fabrication expenses.

BRIEF DESCRIPTION OF THE DRAWINGS

While the specification concludes with claims distinctly pointing out the subject matter that Applicants' regard as their invention, it is believed that the invention will be better understood when taken in connection with the accompanying drawings in which:

DETAILED DESCRIPTION

Figure 1:
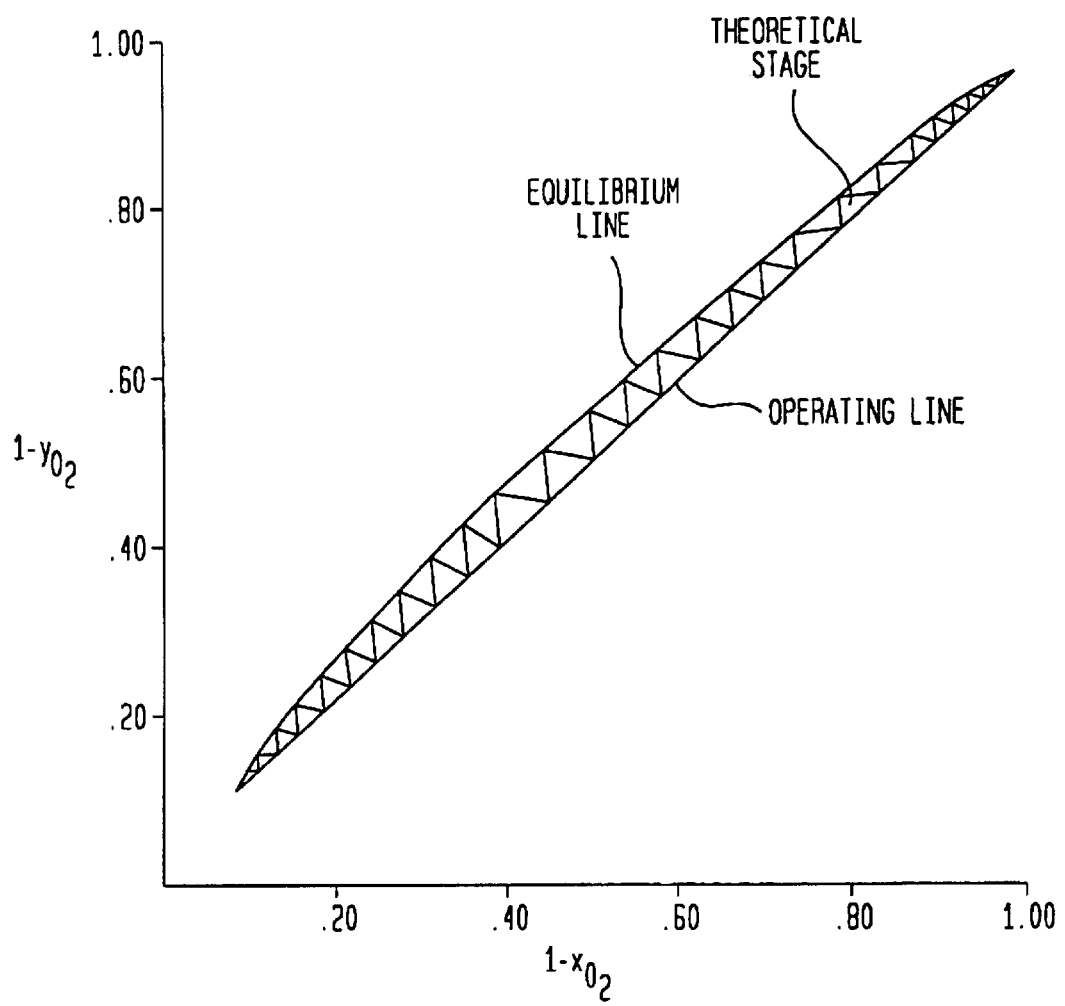
FIG. 1 is a McCabe-Thiele diagram of an argon—oxygen separation.

With reference to FIG. 1, a well know McCabe-Thiele diagram is illustrated for an argon—oxygen separation.

Although not illustrated, in practice, an oxygen-argon containing mixture would be removed from a low pressure column of a double column distillation unit. This mixture, which would contain approximately a 10% argon mole fraction, would be introduced into an argon column.

The mole fraction of the argon within the liquid is charted along the X axis and mole fraction of the argon within the vapor is shown along the Y axis. The operating line has a slope that represents the liquid to vapor ratio within the column and the equilibrium line is a representation of a line along which liquid and vapor phases of the mixture can exist at equilibrium. As liquid descends within the column (starting at the upper right hand corner of the graph and moving left) it may be graphically determined as to how many theoretical stages are required to effectuate the distillation. In the illustrative case, a mixture containing 98% argon is produced at the top of the column. A theoretical stage or plate may therefore be defined as one that gives rise to an effluent vapor in equilibrium with the liquid leaving the stage.

Theoretically, simply including the number of theoretical stages in a distillation column, as indicated in a McCabe-Thiele diagram, will produce a particular desired distillation. This has been found by the inventors not to be possible because the liquid concentration can vary in a transverse direction of the column. Such variation is known as liquid maldistribution. Typically structured packings are arranged so that sheets of one section of the packing are oriented at and angle of 90° relative to the sheets of the adjacent packing in order to minimize the effect of such a maldistribution of liquid. In any packed column (using either random or structured packing) liquid collectors and redistributors are used to mix the liquid between beds when the total bed height exceeds a predetermined value recommended by the packing manufacturer. Commonly, such redistributors employ orifices at discrete locations to achieve a uniform spread of liquid on top of the packed bed. Even with such intermediate mixing, the component concentration within the liquid can in practice be more on one side of the column than the other based on the distribution system used. The effect of liquid maldistribution can be particularly significant when it occurs in the lowermost bed because it will cause a shift of the slope of the operating line towards the equilibrium curve, thereby causing the driving force for mass transfer separation to approach zero at both ends of the packed bed. This in turn causes very few stages to be effective in such lowermost bed and thus effects production and/or product purity.

It has been found by the inventors herein that in columns operated so that the relative volatility between components is in a range of between about 1.05 and 1.8 and the height of the packing within the column is about six meters or greater that the effect of the maldistribution can significantly effect column performance. Such operating conditions can be found in an argon column used in connection with an air separation plant in which the incoming argon—oxygen containing mixture contains about 20% argon or less and is refined in 40 theoretical stages or more to produce an argon product as an overhead containing at least about 90% argon, preferably about 98%.

It has been found by the inventors herein that if the lowermost bed of packing is sized to be in a range of between about 50% and about 80% of the height of the next overlying bed of packing, then there is less of a probability of liquid maldistribution within such bed. In this regard, a height of about 80% of that of the next overlying bed of packing is particularly preferred. If this is done, then the column does not have to be constructed with the same degree of factor of safety in the prior art and therefore, less packing is required overall.

Figure 2:
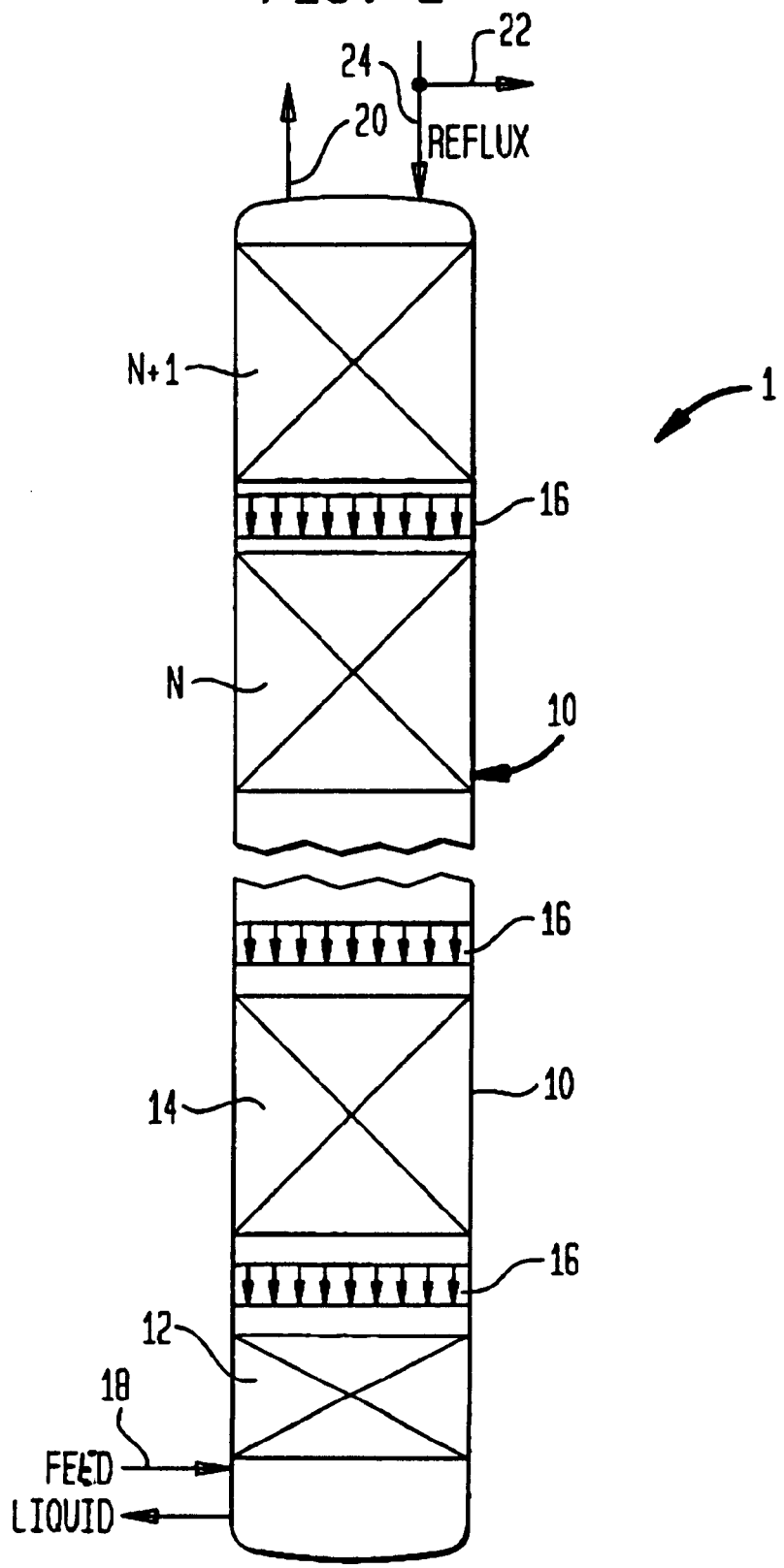
FIG. 2 is a schematic representation of a column for carrying out a method in accordance with the present invention.

With reference to FIG. 2, a column 1 in accordance with the present invention is illustrated. Column 1 has a column shell 10 containing beds of packing 12, 14 and N+1 where beds N and N+1 simply represent overlying beds of packing that would be required to effectuate a particular distillation. Liquid collectors and distributors 16 are interposed between beds of packing. The gaseous feed 18 originating from, for instance a low pressure column in case of an argon oxygen separation, enters distillation column 10 to produce the ascending vapor phase of the mixture. At the top of the column, the vapor may contain greater than 98% concentration by volume of the higher volatility component, for instance argon. This vapor is removed as an overhead stream 20 which is condensed and may be divided into a product stream 22 and a reflux stream 24 to be returned to the column 1.

In order to effectuate a preferred method in accordance with the present invention bed 12, the lowermost bed, should be sized in a range of between about 50% and about 80% of the height of the next overlying bed 14, above bed 12. Preferably, bed 12 is sized to be about 80% of bed 14. In column 1, multiple beds are used above bed 12, namely, beds 14, N, N+1 and etc. Each of the beds 14 and etc. can be given an equal number of stages. Therefore, bed 12 may contribute 15 stages and preferably does so in case of an argon oxygen-separation whereas bed 14 and the remainder of the beds contribute roughly 20 theoretical stages or more.

Although the present invention has been described in reference to an Argon column, as will occur to those skilled in the art, the present invention is not limited to such a separation and as has been discussed, has greater applicability. Further, as will also occur to those skilled in the art, numerous changes, additions and omissions may be made without departing from the spirit and scope of the present invention.

We claim:

1. A distillation method comprising:
   introducing a mixture into a packed column, the gaseous mixture comprising higher and lower volatility components;
   operating the packed column such that the higher and lower volatility components have a relative volatility within said packed column in a range of between about 1.05 and about 1.8; and
   distilling said mixture within said packed column by forming ascending and descending gaseous and liquid phases of said mixture and contacting said gaseous and liquid phases within structured packing arranged within packed beds such that a lowermost of said packed beds has a height within a range of between about 50% and about 80% of a next higher of said packed beds and the total height of said packing within said distillation column is equal to at least about six meters.

2. The method of claim 1 in which said height of said lowermost bed of said packed beds is about 80% of that of said next higher of said packed beds.

3. The method of claim 1, in which more than three of said packed beds are used to effectuate said distillation and said packed beds above said lowermost bed are of equal height.

4. The method of claim 1, wherein said higher volatility component is argon and said lower volatility component is oxygen.

5. An distillation column for distilling a mixture comprising higher and lower volatility components, said distillation column comprising:

a column shell having a bottom inlet to receive said mixture as a gas, a top outlet for discharging a tower overhead stream and a top inlet for introducing a reflux stream into said distillation column; and a structured packing located within said distillation column for contacting ascending vapor and descending liquid phases of said mixture and such that said ascending vapor phase becomes ever more concentrated in said higher volatility component and said liquid phase becomes ever more concentrated in said lower volatility component as it descends;

the structured packing arranged in packed beds such that a lowermost of said packed beds has a height within a range of between about 50% and about 80% of a next higher of said packed beds and the total height of said packing within said distillation column is equal to at least about six meters.

6. The distillation column of claim 5 in which said height of said lowermost bed of said packed beds is about 80% of that of said next higher of said packed beds.

7. The distillation column of claim 5, in which more than three of said packed beds are used to effectuate said distillation and said packed beds above said lowermost bed are of equal height.

8. The distillation column of claim 5, wherein said distillation column is an argon column operable for connection with a lower pressure column of a double column air separation unit.

* * * * *